United States Patent [19]

Lauve

[11] 4,310,872
[45] Jan. 12, 1982

[54] AUTOMOBILE FRONT END UNIT
[75] Inventor: Henry de S. Lauve, Troy, Mich.
[73] Assignee: Electric Fuel Propulsion Corp., Troy, Mich.
[21] Appl. No.: 87,621
[22] Filed: Oct. 23, 1979
[51] Int. Cl.³ .............................................. B60Q 1/00
[52] U.S. Cl. .................................... 362/82; 362/284; 362/311
[58] Field of Search ........................ 362/82, 284, 311
[56] References Cited
U.S. PATENT DOCUMENTS
3,543,234 11/1970 Kennelly ............................ 362/82 X Primary Examiner—Stephen J. Lechert, Jr.
Attorney, Agent, or Firm—Cushman, Darby & Cushman

[57] ABSTRACT

A unitized automotive front end as provided incorporates the bumper and headlights. The latter are mounted behind a translucent, aerodynamically-shaped, bullet-like airfoil having hinged-at-the-front panels which pivot down the back to expose the headlights. Fail-safe operation is assured by the capacity of the lights to shine through the panels should the panels fail to open. The front end may also incorporate conveniently located terminals and controls for facilitating recharging the vehicle batteries.

8 Claims, 7 Drawing Figures

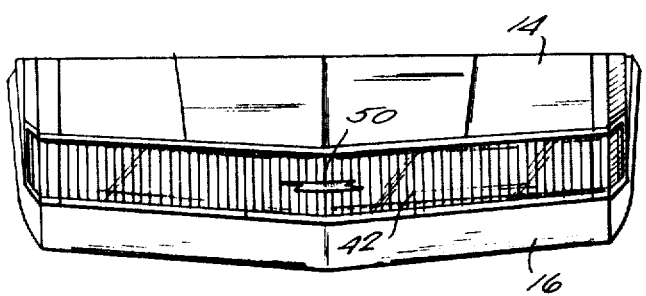

AUTOMOBILE FRONT END UNIT

BACKGROUND OF THE INVENTION

Many developmental and pilot-scale production models of electric automobiles and trucks have as their basis some standard production model of a normally I.C. engine vehicle, minus its I.C. engine and certain other components. Onto that basis is grafted the electric motor, the electric storage battery compartment, charging fittings and other components of an electric vehicle.

As used here, the "front end" of the automobile designates that part of the body/frame provided at the front of the vehicle front wheels and front engine or storage compartment, and which bears the headlights, front bumper and the like. "Automobile" as used herein is intended to be generic to cars, trucks, buses and the like.

Many of the electric vehicles of the kind referred to above simply adopt and make-do with the front ends of the production model of the normally I.C. engine vehicle on which they are based. Such a practice has several drawbacks. The adopted structure may have poor aerodynamic qualities because of its original purpose to incorporate an air intake grille for an I.C. engine, particularly a liquid-cooled one. The adopted structure may have been designed when gasoline was cheap and the designers had no overwhelming mandate to consider aerodynamic qualities favoring energy efficiency. And electric vehicles have their own ways of being made more efficient and more convenient, ways that are missed when a conventional automotive front end is merely carried forward. For instance, because it is necessary to recharge the batteries of a regularly used electric vehicle fairly frequently, e.g. quickly at a station or overnight charging station comparable to a gasoline filling each night or several times a week, it is advantageous to provide conveniently located charging terminals on the vehicle for connecting the batteries with a generator or other charger.

It is known that an automobile front end may be made more streamlined if doors or lids are provided for the headlights, or the headlights are rotated around to present a streamlined surface forwards when not in use. Several problems are associated with various designs of such headlight provisions. Many present a streamlined configuration forwards only when the headlights are not in use; typical of this is the "frog eyes"-type rotating headlights which provide considerable wind resistance when in use. Some light doors, lids and rotating mounts work poorly in icy weather, sticking closed or partly closed making the vehicle impossible or less safe to operate and just at a time when safe operation of the vehicle is a more dicey proposition.

SUMMARY OF THE INVENTION

A utilized automotive front end as provided incorporates the bumper and headlights. The latter are mounted behind a translucent, aerodynamically-shaped, bullet-like airfoil having hinged-at-the-front panels which pivot down in back to expose the headlights. Fail-safe operation is assured by the capacity of the lights to shine through the panels should the panels fail to open. The front end may also incorporate conveniently located terminals and controls for facilitating recharging the vehicle batteries.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings:

FIG. 4 is a top plan view thereof;

DETAILED DESCRIPTION

Figure 1:
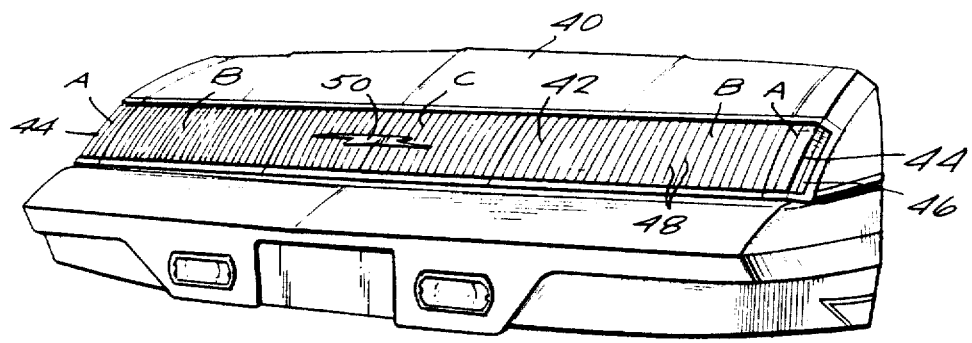
FIG. 1 is a perspective view from the front and left side of an automobile front end of the present invention.
Figure 2:
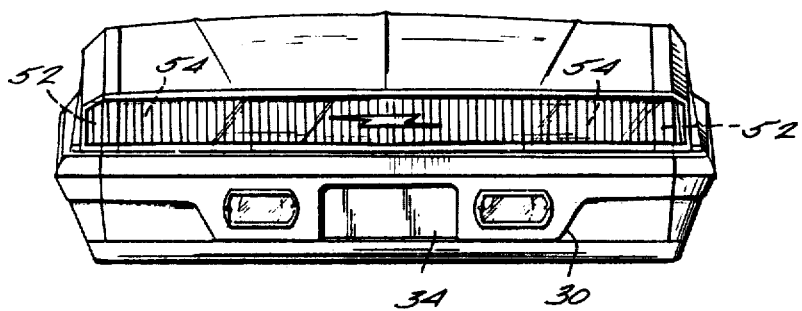
FIG. 2 is a front elevational view thereof.
Figure 3:
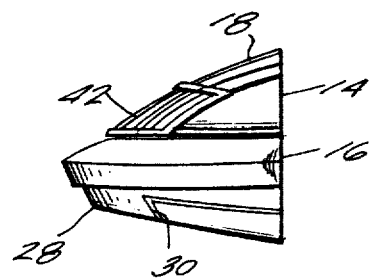
FIG. 3 is a left side elevational view thereof.
Figure 6:
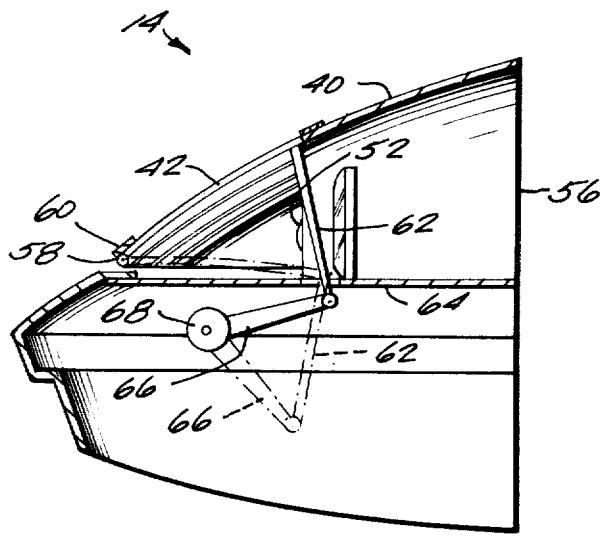
FIG. 6 is a cross-sectional view taken substantially on line 6—6 of FIG. 5.
Figure 7:
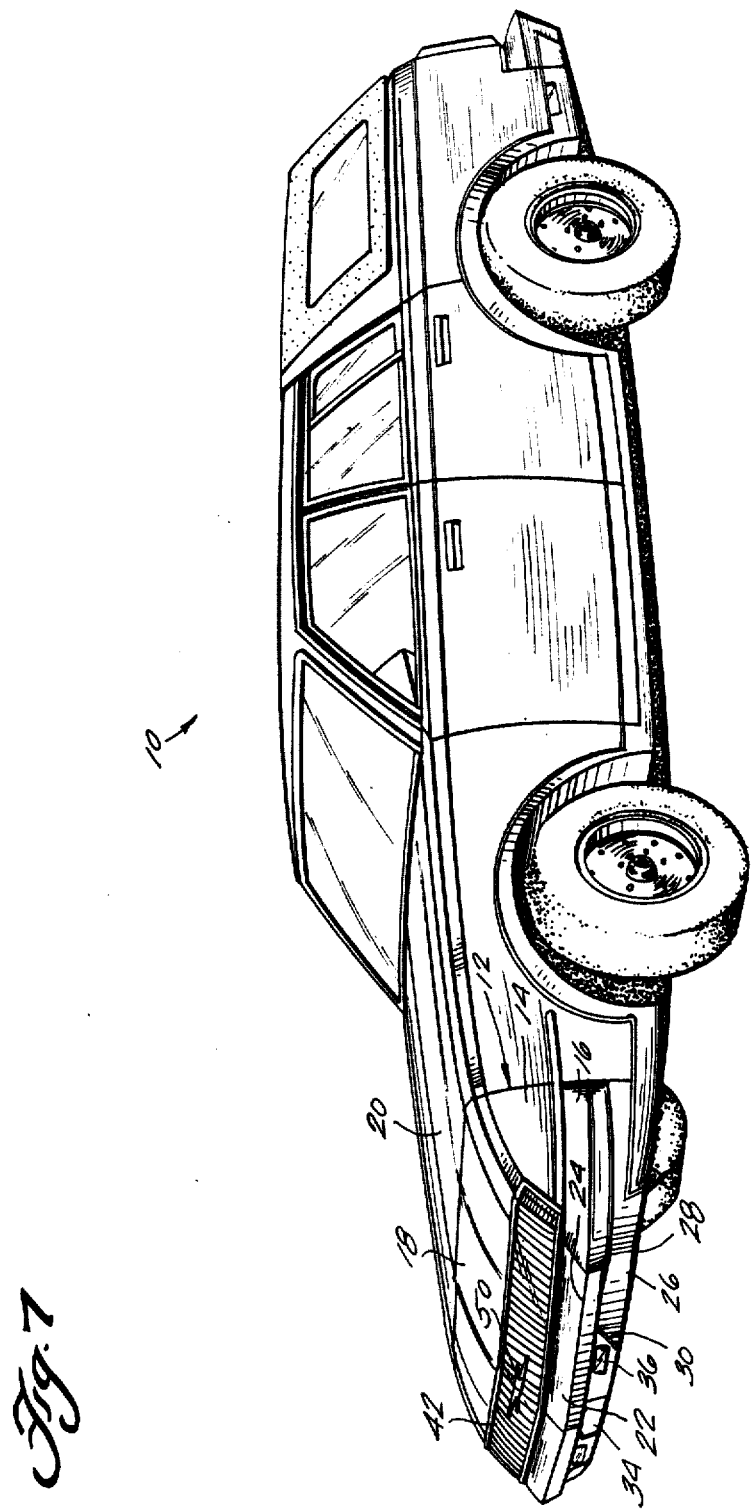
FIG. 7 is a perspective view of an automobile from the front and left side, which automobile is shown provided with a front end according to the present invention.

FIG. 7 shows for illustrative purposes an automobile 10 having a front end unit 12 of the present invention provided thereon. Although the principles of the present invention would apply to a greater or lesser degree in the manufacture of front ends for vehicles having I.C. main power plants whether at the front or at the rear, the front end unit 12 was deviced for use on an electric automobile. It is illustrated in FIG. 6 being used on a Silver Volt prototype automobile of Electric Auto Corporation. This particular automobile preferably incorporates an auxiliary gasoline engine (not shown) for powering air conditioning and similar devices, and for providing emergency power for averting a dead-in-the-road result from excessively discharging the electrical storage batteries between charges.

The front end unit 12 is conventionally provided at its rear with conventional fastening means, through the use of which the front end unit 12 may be conventionally assembled to the remainder of the automobile.

Note from FIG. 7 that the streamlined appearance of the remainder of the automobile 10 carries forward onto the front end unit 12.

The front end unit 12 includes two major subassemblies: a housing shell sub-assembly 14, and a bumper sub-assembly 16. The bumper sub-assembly preferably comprises a molded body of polyurethane or other stiffly elastic plastic material. The bumper sub-assembly is mounted to the remainder of the automobile at the front of the remainder, in underlying juxtaposition with the housing shell sub-assembly 14.

Preferably the upper surface 18 of the housing shell sub-assembly 14 slopes forwards and downwards continuing and accentuating the longitudinal curve of the surface at the bonnet lid 20. This curve is carried further forwardly and downwardly on the underlying bumper sub-assembly at 22 to a ridge line 24 which is presented forwards. Below the line 24, the front surface 26 of the bumper sub-assembly recedes downwardly and rearwardly at 28, generally mirroring its shape above the ridge line 24. At 30 the bumper, laterally recedes toward the respective wheel 32 along a slightly inclined bottom surface; medially, the bumper is shown provided with a license plate holder 34 and fog lights 36.

The front license plate holder 34 preferably is shiftably mounted (much the same way that rear license plate holder of I.C. engine powered automobiles are spring hinged to provide for access to the fuel filler spout). However, in the instance of the automobile 10, shifting the license plate holder temporarily out of the way exposes the charging plug 38, i.e. the electrical terminal assembly into which a charging means is plugged in order to recharge the batteries on which the automobile's electric motor runs.

Figure 5:
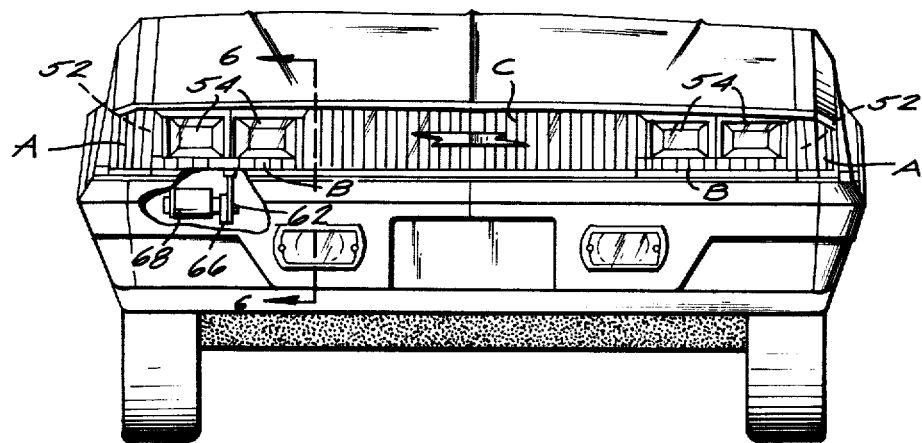
FIG. 5 is a front elevational view thereof showing the headlight door panels in a lowered condition and with portions broken away to expose internal details.

Although from FIGS. 1–4 and 7 it might appear that the upper surface 18 of the housing shell sub-assembly 14 is provided as a fabricated but static structure, a comparison with FIGS. 5 and 6 will show that it has moving parts.

In fact the housing shell sub-assembly 14 includes a static shell 40 of opaque material such as molded engineering plastics and/or sheet metal, and a jewel-like band 42 of translucent glass or plastic material.

As seen from the front and from above, the band 42 appears to be generally rectangular across the full width of the front of the automobile, sloping forwardly and downwardly with a slight forward, upward convexity relative to both the longitudinal and transverse axes of the automobile. At the front corner lines 44 of the sides of the automobile, the band 42 wraps around onto the sides at 46.

The band 42 is shown provided with a transversally extending series of regularly spaced grooves 48 which at least generally parallel the longitudinal axis of the automobile. The grooves 48 may be molded in the inner or outer faces of the material of which the band 42 is made, or may in fact be molded-in or painted-on narrow stripes in simulation of grooves. These features are generically referred to herein as pin stripe means. Centrally, at 50, a particular automotive logo body is shown secured on the translucent band 42.

The band 42 may be fabricated of clear, untinted glass or plastic material, or body-tinted and/or surface-tinted, and/or surface decorated and/or partially vacuum metalized or the like to provide somewhat of a defracting-reflecting mirror appearance as viewed from the outside looking in. The nature of the band 42 is to make whatever structure as is provided behind it invisible or nearly invisible to the casual observer even in daylight, yet make it possible for the automotive turn signals/cornering lights 52 and headlights 54 to be useably visible through the band when any of these lights is turned on. The lights 52, 54 are conventionally mounted in light sockets which are incorporated in the front of the generally vertical rear wall 56 of the housing shell sub-assembly 14 so as to be spaced behind and covered by the translucent band 42.

The translucent band 42 is preferably composed of five segments, these being the flanking segments A which remain stationary over the directional/cornering lights 52, the logo-bearing central portion C which remains stationary, and the doors or panels B over the headlights 54.

When the headlights 54 are "off", the band 42 segments B, the doors or panels over the headlights remain raised in place so that the band 42 has a continuous appearance. The edges of the panels, where each two abut, coincide with a respective pin stripe means 48 further disguising the physically discontinuous character of the band 42.

Each panel B, which is generally rectangular in figure although shallowly arched so as to be externally somewhat convexly rounded, has a lower edge margin that is hinged to the assembly 14 at the lower lip 58 of the stationary frame 60 of the band 42. Unobtrusively within the housing 14 a strut 62 is pivotally secured to the respective panel B near the upper, trailing edge of the band 42, midway along the width of the respective panel B. That strut 62 extends down through a slot in the floor 64 of the lighting compartment behind the panel B, where it is connected to the crank arm 66 of a small electric motor 68 or other source of equivalent movement.

When the motors 68 are operated to rotate the cranks 66 downward (clockwise, assuming the FIG. 6 orientation) the headlight-covering panels are rotated downward, e.g. from the upper position, shown in full lines in FIG. 6 to the lower position shown in FIG. 5 and in dashed lines in FIG. 6. The panel lowering may be manually actuated, or may be caused to be automatically initiated by conventional means when the vehicle headlights are turned on. A reverse movement provided in a like manner will raise the headlight-covering panels back into place when the headlights are turned "off". The operating motors 68 may be mounted on the housing shell assembly 14 or on the bumper assembly 16. Even should ice or snow prevent the panels from moving down out of the way when the headlights are turned on, the translucent nature of the band 42 will let the lights shine through, simply avoiding a possible emergency.

Thus, the present invention provides a futuristic-looking striped band of safety plastic or glass across a vehicle front end, normally covering the directional lights and headlights. The front end unit also provides access for an emergency generator and to charge plugs. The simple bullet-like aerodynamic shape of the front end unit decreases energy consumption in comparison with use of grilled front ends of front engine normally I.C. engine-powered production automobiles. The headlights are normally hidden, yet the cover panels are translucent just in case the panels cannot or do not fold down when the headlights are in use and must shine through the cover panels. Lowering of the headlight cover panels does not create "frog eye" lighting device protrusions on the automotive hood; rather, the lighting devices remain recessed, providing a streamlined, energy efficient automobile front end unit.

It should now be apparent that the automobile front end unit as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A unitized automotive front end, including:
   a bumper means;
   a shell juxtaposed with the bumper means;
   a pair of headlight sets mounted in said shell;
   a translucent, aerodynamically-shaped, transversally extensive airfoil mounted on said shell and normally covering both said headlight sets by extending forwardly and downwardly in an arch which passes in front of both said headlight sets;
   said translucent airfoil having intermediate the left and right ends thereof two transversally spaced headlight cover panels, each having a forward, lower edge hinged by hinge means with respect to said shell, in order to permit the cover panels to be rotated down so that the headlight sets may shine out of the shell over what normally would be the exterior surfaces of said headlight cover panels; and adjustable strut means normally holding said cover panels up in line with the remainder of said translucent airfoil, but operable to rotate said panels downward about said hinge means.

2. The unitized automotive front end according to claim 1, wherein:

said translucent airfoil is constituted by a band having a transversally extending series of longitudinal pin stripe means provided thereon, with each headlight cover panel having a left margin and a right margin coinciding with respective ones of said stripe means.

3. The unitized automotive front end according to claim 2, wherein:

said stripe means are constituted by grooves formed in said band.

4. The unitized automotive front end according to claim 2, wherein:

said stripe means are constituted by lines of paint applied on said band.

5. The unitized automotive front end according to claim 1, further including:

said bumper having a front license plate holder hinged thereto; and a set of battery charging plugs provided on said unitized automotive front end and normally concealed behind said license plate holder.

6. The unitized automotive front end according to claim 1, further including:

a left and a right directional signal light mounted in said shell;

said translucent airfoil covering and passing in front of both said directional signal lights.

7. The unitized automotive front end according to claim 1, further including:

motor means mounted thereon and connected crank-fashion to said strut means for raising and lowering said headlight cover panels about said hinge means.

8. The unitized automotive front end according to claim 1, wherein:

said shell is vertically juxtaposed on said bumper means and forms a bullet-shaped profile therewith.

* * * * *